United States Patent [19]

Jentsch

[11] 4,221,820
[45] Sep. 9, 1980

[54] METHOD OF INCREASING THE DURABILITY OF MILK

[76] Inventor: Hans G. Jentsch, Daimlerstrasse 4, Essen, Fed. Rep. of Germany

[21] Appl. No.: 959,475

[22] Filed: Nov. 13, 1978

Related U.S. Application Data

[63] Continuation of Ser. No. 793,251, May 3, 1977, abandoned.

[30] Foreign Application Priority Data

May 3, 1978 [DE] Fed. Rep. of Germany ....... 2619073

[51] Int. Cl.² ................................................ A23C 3/02
[52] U.S. Cl. ................................. 426/410; 426/399; 426/409; 426/522
[58] Field of Search ............... 426/412, 410, 399, 401, 426/522, 409

[56] References Cited

U.S. PATENT DOCUMENTS

| | | | |
|---|---|---|---|
| 1,005,275 | 10/1911 | Mollinger | 426/401 X |
| 1,095,231 | 5/1914 | Rogers | 426/401 |
| 1,141,566 | 6/1915 | Lester | 426/401 |
| 1,255,483 | 2/1918 | Startzenbach | 426/401 |
| 2,049,591 | 8/1936 | Rafn | 426/399 |
| 2,153,542 | 4/1939 | Ball | 426/401 |
| 2,541,113 | 2/1951 | Smith et al. | 426/401 |
| 2,549,216 | 4/1951 | Martin | 426/399 |
| 2,642,363 | 6/1953 | Moeri | 426/401 |
| 2,886,450 | 5/1959 | Stewart et al. | 426/401 X |
| 3,464,835 | 9/1969 | Castro | 426/412 |
| 3,892,058 | 7/1975 | Komatsu et al. | 426/412 X |
| 4,000,326 | 12/1976 | Okada et al. | 426/412 |
| 4,009,312 | 2/1977 | Hayashi et al. | 426/412 |

*Primary Examiner*—Steven L. Weinstein

[57] ABSTRACT

A method of increasing the durability of fresh milk when filling the same into containers and packages, in which the fresh milk is pasteurized with a short-term preheating to approximately 100° to 120° C. for killing pathogenic germs and subsequently processed at 70° to 80° C. The thus treated milk is packaged at a temperature from 70° to 80° C. within an aseptic protective gas atmosphere into heat resistant, substantially gas-tight synthetic foil packages and immediately after closing of the packages the milk is cooled in several stages, first rapidly to 50° to 60° C. and thereafter to a predetermined storage temperature.

6 Claims, No Drawings

METHOD OF INCREASING THE DURABILITY OF MILK

This is a continuation, of application Ser. No. 793,251, filed May 3, 1977, now abandoned.

BACKGROUND OF THE INVENTION

The present invention relates to a method of increasing the durability of fresh milk. Heretofore, two alternative methods were used to obtain a greater durability of packaged fresh milk, namely post-sterilization of milk in glass bottles in sterilization towers; or pre-sterilization of milk by ultra-high heating and subsequent cold filling under substantially aseptic conditions.

All known methods of filling milk while cold were subject to considerable disadvantages. An increase in the durability of the milk did impair especially the taste and nutrition-physiological qualities of the milk. In particular when preceded by ultra-high heating, a considerable re-infection risk existed which could only be reduced and held within bounds by high operational cost.

BRIEF SUMMARY OF THE INVENTION

It is, therefore, an object of the present invention to provide a method of increasing the durability of milk, and especially of fresh milk.

Another object of the invention consists in packaging fresh milk in a form substantially sterilized and disinfected and free of the risk of re-infection.

Still furthermore, it is an object of the invention to make fresh milk durable for storage of from 2 to 6 weeks depending on the quality of the milk.

It is still another object of the invention to package fresh milk in substantially sterilized form free of the risk of re-infection while avoiding any noticeable impairment of taste and/or reduction in the nutrition-physiological quality of the milk.

In addition, it is an object of the invention to keep operational costs relatively low when filling or packaging fresh milk in a sterilized and re-infection free manner.

The above mentioned objects have been realized in accordance with the present invention by recognizing that the disadvantages of heretofore known methods are caused primarily by cold filling or packaging of the milk and that the risk of re-infection can be eliminated, for all practical purposes, by including the filling and packaging process into the time period in which milk is kept hot, hereinafter referred to as the "hot holding period".

Accordingly, the present invention proposes subjecting the fresh milk to pasteurization including a short-term preheating to approximately 100° to 120° C., preferably to 105° C., for reliably killing all pathogenic germs and to subsequent further processing at approximately 70° to 80° C., preferably at approximately 72° C. Thereafter, at a temperature of from 70° to 80° C. within an aseptic protective gas atmosphere, the milk is filled into heat-resistant, substantially gas-tight synthetic compound or laminated foil packages and immediately upon closing of the packages is cooled in several stages, first to approximately 50° to 60° C., preferably about 50° to 55° C., and thereafter to the planned storage temperature.

It was found that the raw milk germ content in practice varies widely (differences in the raw milk germ content differing by a factor of 100 are not unusual). If the germ content is low it is possible to achieve the increase in the durability of filled and packaged fresh milk, in accordance with the present invention, also without the short preheating step to 100° to 120° C., when retaining the other above-mentioned method steps.

Impairment of the taste of the milk can be avoided especially by limiting and shortening as far as possible the hot holding period, in which the milk is held at a temperature of, or above, approximately 55° C. With hot holding periods of from 40 to 50 seconds reached in practice and distributed over the hot treatment in the pasteurizer and the hot holding period in the package until reaching the first re-cooling stage of approximately 50° to 60° C., the taste of the thus treated milk was not noticeably affected. After filling at 70° to 80° C., preferably at 72° C., the milk should be subjected to shock cooling to a temperature of 50° to 55° C. in order to shorten the hot holding period. Thereafter, the pasteurized and hot packaged milk is cooled to the storage temperature. This last mentioned cooling to the storage temperature is not critical as to time.

Hot filling in an aseptic protective gas atmosphere eliminates the re-infection risk existing in known filling methods and prevents at the same time ingress of air into the packages which could otherwise cause oxidation processes and foster the formation of new bacteria or germs.

Preheating of the fresh milk, which is necessary particularly with raw milk of high bacteria or germ content, preferably should amount to approximately 3 to 5 seconds with a hot holding period (milk temperature at or above 55° C.) of approximately 40 to 50 seconds.

Several modifications are possible without deviating from the basic idea of the present invention. Thus, for instance, as mentioned above the preheating of raw milk having a low germ content can be eliminated, or instead of the short-term preheating to approximately 100° to 120° C., also ultra-high heating of the milk to temperatures up to 145° C. may precede the hot filling according to the present invention at a temperature of from 70° to 80° C. With the just-mentioned ultra-heating, however, there exists the danger that the taste of the milk will be somewhat affected.

I claim:

1. A method of increasing the durability of fresh milk when filling the same into containers and packages, comprising the steps of: subjecting the fresh milk to pasteurization including a short-term preheating to approximately 100° to 120° C. for killing all pathogenic germs; cooling the milk to a filling temperature in the range of 70° to 80° C.; filling the thus treated milk at said filling temperature within an aseptic protective gas atmosphere into heat resistant, substantially gas-tight synthetic foil packages; closing said packages; and immediately thereafter cooling the milk in several stages, first rapidly to 50° to 60° C. and thereafter to a predetermined storage temperature, said steps of subjecting to pasteurization, cooling to the filling temperature, subsequent filling and closing, and reaching the first recooling stage of from 50° to 60° C., being carried out within a hot holding period of approximately 40 to 50 seconds.

2. A method according to claim 1, comprising subjecting the milk after said filling step at 70° to 80° C., to shock-cooling to a temperature of from 50° to 55° C., in order to shorten the hot holding period of the fresh milk.

3. A method according to claim 1, wherein said preheating is effected for 3 to 5 seconds.

4. A method of increasing the durability of fresh milk when filling the same into containers and packages, comprising the steps of: filling substantially bacteria free milk at a filling temperature from 70° to 80° C. within an aseptic protective gas atmosphere into heat resistant, substantially gas-tight synthetic foil packages; closing said packages; and immediately thereafter cooling the milk in several stages, first rapidly to 50° to 60° C. and thereafter to a predetermined storage temperature, said steps of filling and closing of the container until reaching the first recooling stage to 50° to 60° C., being carried out within a hot holding period of approximately 40 to 50 seconds.

5. A method according to claim 4, comprising subjecting the fresh milk after filling at said filling temperature to a shock cooling lowering the temperature to 50° to 55° C., to thereby shorten the hot holding period of the fresh milk.

6. A method according to claim 4, further comprising ultra-hot heating the milk at temperatures above 120° C. and up to 145° C., prior to hot filling at a temperature of from 70° to 80° C., with said hot holding period further including the ultra-hot heating treatment of the milk.

* * * * *

UNITED STATES PATENT AND TRADEMARK OFFICE
CERTIFICATE OF CORRECTION

PATENT NO. : 4,221,820
DATED : September 9, 1980
INVENTOR(S) : Hans G. Jentsch

It is certified that error appears in the above—identified patent and that said Letters Patent is hereby corrected as shown below:

On the Title Page, correct to read as follows:

-- (30) Foreign Application Priority Data

May 3, 1976 (DE)   Fed. Rep. of Germany...2619073 --.

Signed and Sealed this

Third Day of February 1981

[SEAL]

*Attest:*

RENE D. TEGTMEYER

*Attesting Officer*   *Acting Commissioner of Patents and Trademarks*